Patented Oct. 11, 1932

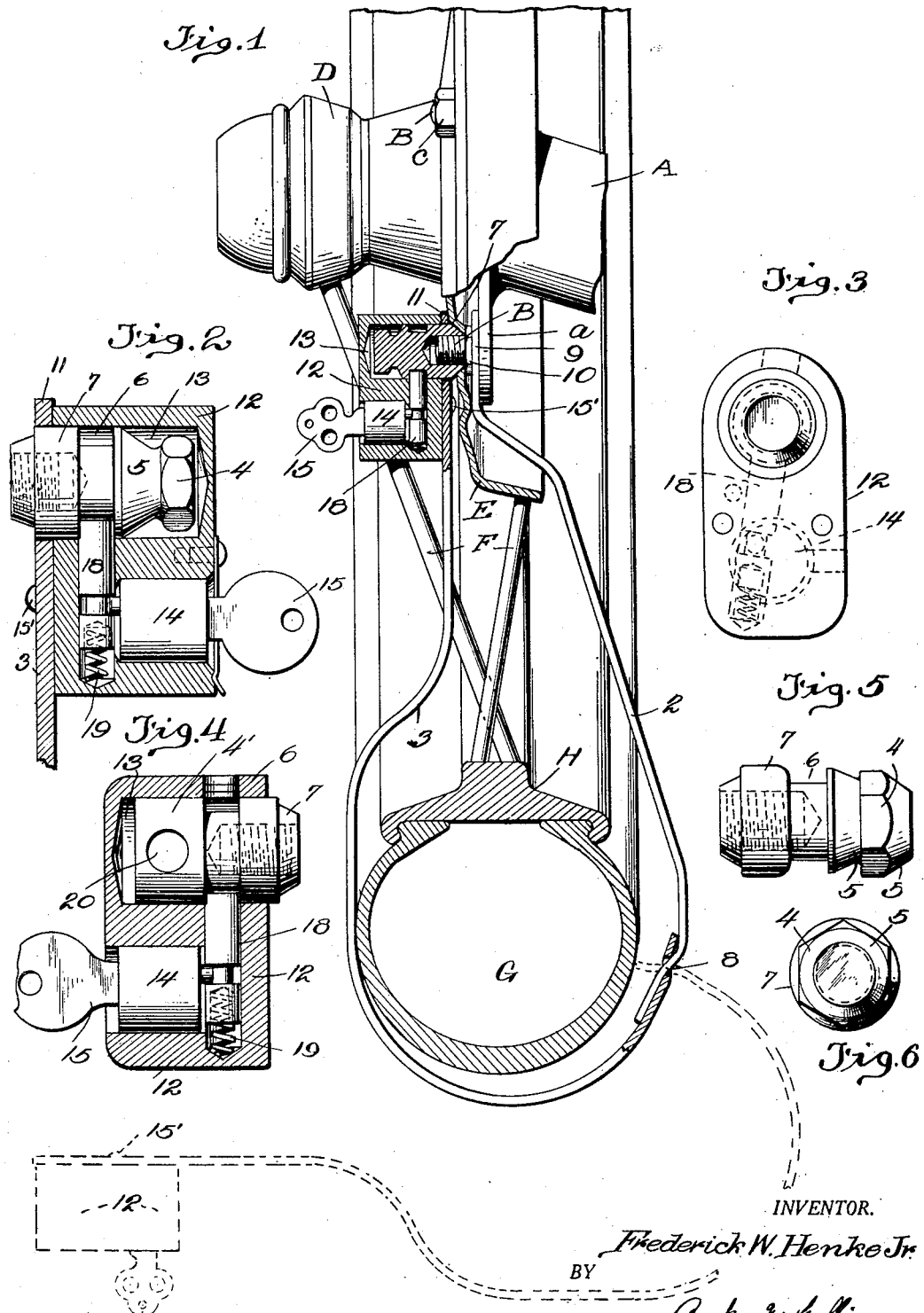

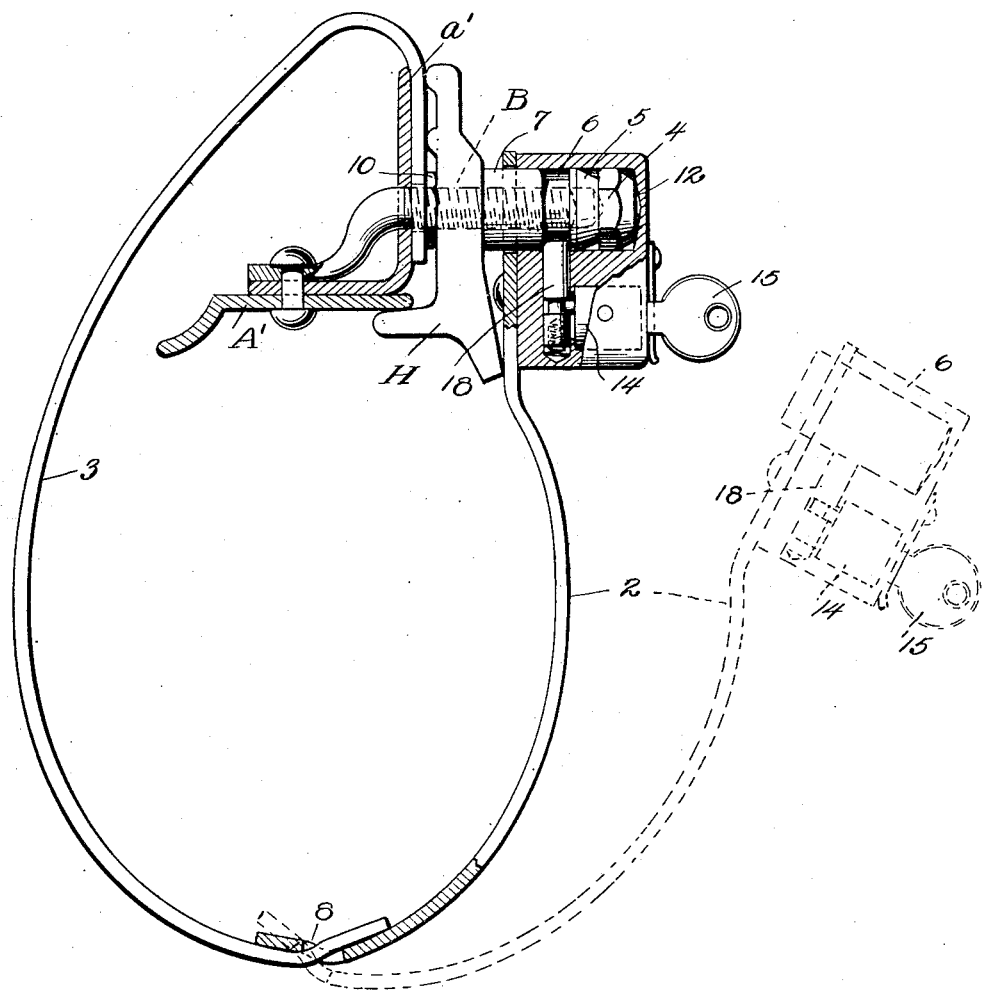

1,881,567

UNITED STATES PATENT OFFICE

FREDERICK W. HENKE, JR., OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE

SPARE WHEEL AND TIRE LOCK

Application filed June 13, 1928. Serial No. 285,079.

The present invention has for its object to produce an improved lock for an automobile wheel when carried as a spare, which lock serves not only to unite the wheel to the wheel carrier securely and against unauthorized removal, but also to prevent the removal of the tire from the wheel while carried as a spare.

In the accompanying drawings illustrating the invention in its preferred form:

Fig. 1 is a broken view partly in vertical section representing the locking means in use for securing the spare wheel upon a wheel carrier of a form in common use at the rear of an automobile.

Fig. 2 is a sectional view through the guard serving as a housing for the nut that secures the locking means to the wheel carrier, and which serves also as a carrier and casing for a lock that is employed to unite the guard to the said nut in position covering it.

Fig. 3 is an end view of the housing and lock carrier shown in Fig. 2.

Fig. 4 is a view similar to Fig. 2, except that it shows a different form of special nut.

Fig. 5 is a detached elevation of a special nut differing from those illustrated in Figs. 2 and 4 in certain particulars.

Fig. 6 is an end view of the nut shown in Fig. 5.

Fig. 7 is an elevation of the invention applied to a tire holder of different form from that shown in Fig. 1.

In the drawings A represents a wheel carrier such as is commonly found at the rear of an automobile for supporting a spare wheel. It is provided with a plate or disk, $a$, from which project several screw-threaded studs or bolts B, that are arranged so as to extend through the holes formed through the disk or skirt of the wheel and which are provided to receive the bolts employed in securing the wheel to the axle with which it turns when in use as a support for the vehicle.

A spare wheel is represented in the drawings as being supported upon the wheel carrier, and such wheel comprises a hub D, a skirt or disk E surrounding the hub, spokes F and a felly or tire rim H, on which is mounted a removable tire G, that represented being of the pneumatic type. When a wheel, such as shown, is supported by the wheel carrier A, the threaded bolts or studs B that project outwardly from the plate $a$ of the wheel carrier extend through the skirt or disk portion E of the wheel, which is there secured by one or more nuts C engaging screw-threaded studs B and a special nut 7 that engages with another of the studs B. The plate $a$ of the wheel carrier is of a size to be entirely covered or overlapped by the skirt E of the wheel. The nut 7 has formed in its exterior a circumferential groove 6, a conical portion 5 beyond the groove and an angular part 4 beyond the conical part adapted to be engaged by a wrench.

In order to provide an anti-theft device for preventing the removal of the wheel from the carrier, or of the tire from the wheel, the locking mechanism which will now be described is employed.

A band, formed of steel of a hardness to resist the action of cutting tools, such as one feloniously seeking to remove a spare tire from its carrier would employ, is caused to encircle the tire and rim of the wheel and to have its ends connected with the tire carrier, the special nut 7 and the bolt or stud with which it engages being utilized for this connection. The band is preferably formed of two sections 2, 3, hinged together at 8. The hinge is located at the rear of the wheel tire, so that the forward section of the band, 3, may be swung downwardly as represented in dotted lines, Fig. 1, to permit the wheel to be easily applied to the wheel carrier, or removed therefrom. After being applied, the section 3 should be swung up into the position indicated in full lines and secured in place. When so secured the band forms a closed loop encircling the tire and wheel rim.

The inner end 9 of the section 2 of the band is shaped so as to lie flat against the plate $a$ of the wheel carrier, it being perforated to permit it to be passed over one of the screw-threaded bolts or studs B. This portion, 9, of the band may be securely held against the wheel carrier plate by a thin nut 10 that engages with the stud B. When the wheel is applied to the carrier, the skirt or central disk E of the wheel covers the attached end of the band section 2 and the nut 10 that unites it to the wheel carrier, the nut lying between the wheel carrier plate *a* and the central disk or hub skirt E of the spare wheel, being thus inaccessible. The outer free end of the section, 3, of the band is likewise perforated, as indicated at 11, such perforation being sufficiently large to not only freely pass over the end of the screw-threaded stud B, when the section is swung from its lower position shown in dotted lines Fig. 1 to the position shown in full lines, but as well pass over the special nut 7 that may be applied to such bolt or stud. The special nut 7 is not locked upon the bolt or stud—that is to say it is at no time held against free rotation thereon. It is, however, housed or covered, when the band is closed to encircle the wheel tire, so as to prevent access thereto. The member that serves as a housing for the special nut is constructed to serve also as a casing for a lock employed to lock the band in closed position encircling the wheel tire. The guard that has just been referred to is preferably formed of hard tool-resisting metal and is represented as consisting of a body 12 in which is formed a chamber 13 to receive the nut 7. There is a second chamber formed in the body of the guard to receive the cylinder 14 of a lock adapted to be operated by a key 15. The guard member 12 is secured, as by rivets 15′, to the free end of the swinging section 3 of the encircling lock band. The chamber 13 is open at its inner end but is closed at its outer end by the front wall 16 of the housing body, and it is coaxial with the opening 11 through the free end of the band section 3.

The lock, the cylinder 14 of which is supported so as to be turned by the key 15, may be of any suitable construction, and is represented as being provided at its inner end with a cam pin 17 that is adapted to throw the plunger 18. This latter is preferably movable in a path at right angles to the axis of the cylinder 14, and its free end enters the chamber 13 and is adapted to lie in the circumferential groove 6 in the special nut 7. A spring 19 acts upon the plunger 18, tending to move it inwardly, or toward the special nut, but permits it to be moved outwardly or back from the cavity 13.

In Fig. 4 there is represented a form of special nut 7, differing from that illustrated in Fig. 2 in that the conical portion 5 is omitted, the head of the nut 4′ being immediately adjacent to the circumferential groove 6 into which the plunger 18 of the lock enters. When a lock of the style shown in Fig. 4 is used the key 15 has to be employed both in applying the guard and in removing or separating it from the nut. The head 4′ is represented as being perforated at 20 to receive a rod or bar by which the nut may be turned upon the stud B, such bar or rod being used in lieu of a wrench.

In Figs. 5 and 6 is represented a nut in which the head 4 is provided at its outer end with a conical portion 5′ that is supplemental to the conical part 5. This form of the invention is especially advantageous when the nut 7 is of relatively large size, the conical end 5 causing the plunger of the lock to be pushed back so that it will easily pass over the hexagonal portion of the nut head.

It will be observed that the band that encircles the wheel tire has one of its ends behind the hub skirt or central disk of the wheel, where it is secured to the wheel carrier, it being covered and rendered inaccessible by such skirt or disk whenever the wheel is placed upon the carrier. It will also be seen that the other end of the tire-encircling, locking band is in front of the disk or hub skirt of the wheel, where it is secured against unauthorized access by locking mechanism carried by the free swinging end of the tire band. The tire-locking band in forming the loop that encircles the tire, as represented in the drawings and described, passes through the wheel, that is between the spokes thereof, at a point between the tire rim and the hub of the wheel. The lock guard 12 is located well within the wheel— that is between individual spokes and between the wheel hub and the tire rim—, so that access to the guard and the lock for the purpose of breaking the lock, and separating it from the band and the special nut with which it is connected and which it serves to house, is difficult, and yet the lock is easily accessible for manipulation by the use of the proper key 15.

The invention would be operative as a theft-preventing wheel and tire lock should the nut 10 be omitted, since the central disk of the wheel would hold the end of the inner section 2 of the band in place, while the locked nut 7 would hold the free end of the other section in position and at the same time securely lock the entire device in place. The nut 10 is desirable in that it holds the tire lock in place when the wheel is removed, permitting the outer or swinging section 3 of the band to drop down into the position indicated in dotted lines in Figures 1 and 7, where it rests during the time the spare wheel is being removed or applied to its support.

The band is so shaped that when in locking position, as represented in Fig. 1 of the drawings, one of the sections 3 bears against the tire, and since the band is resilient this engagement of the band with the tire is availed of to prevent shaking and excessive vibration of the band with incident rattling and noise when in use upon a vehicle in motion. The resiliency of the band permits it to be sprung somewhat when applied and thus to engage with the tire with a yielding pressure sufficient for the purpose stated. The section of the band opposite that which engages the tire is free from engagement therewith as shown, in order that the band may accommodate itself, by reason of its resiliency, to tires of different sizes.

The tire locking device which has been described is used as follows:

When a spare wheel is to be applied to the carrier A, the lock is manipulated, by the use of the key, to disconnect it from the special nut, and the section 3 of the band, carrying the nut guard and the lock, is swung downwardly into the position indicated in dotted lines in Fig. 1. The wheel is then applied to the carrier, with the threaded bolts or studs extending through the bolt holes in the hub skirt or central disk of the wheel, and the nuts C and the special nut 7 are applied to these bolts, thus securing the wheel to the carrier. The movable section 3 of the band is now swung into the locking position indicated in full lines, so the housing covers the special nut and is locked thereto. The band is sufficiently resilient to allow the housing to pass easily endwise over the nut 7. As it does so, the plunger 18 of the lock engages with the cone-shaped portion 5 of the special nut and is thereby moved outwardly sufficiently to pass the cone of the nut. When the end of the plunger comes opposite to the circumferential groove 6 in the nut, the former is moved by the spring 19 and seats in the groove, locking the housing and the movable portion 3 of the band to the special nut.

By using a nut of a construction such as shown in Figs. 2 and 5—that is provided with a conical section or sections—, it is possible to apply the guard and have it come into locking engagement with the nut without necessitating the use of the key. However, the invention is not limited to the employment of the nut of the construction shown so long as the guard covers the nut and there is provision for a movable part of the lock coming into engagement with the nut to hold the guard in position to house the nut. This movement could be effected both for engaging with the nut and for release from the nut through the use of the key, as when employing a nut of the form shown in Fig. 4. The form of nut shown in Figs. 2 and 5, however, is that which is preferred.

In Fig. 7 the invention is represented as used in connection with a carrier A' for a demountable rim on which is supported a tire. This form of carrier is common in the art and it is represented as having a plate piece a' and a screw-threaded projecting stud B. With the carrier is used a clamp I that slips over the stud B and operates to hold the demountable rim in place upon the carrier, the clamp engaging with the edge of the rim and being held in place by the special nut 7. The band that encircles the tire and the rim is, except for shape and details of construction to fit it to the carrier A', like the band shown in Fig. 1. One end of the band is securely held by a nut 10 that clamps the band against the plate a', and is located between the band and the clamp piece I when the parts are assembled as represented in the drawings. The other end of the band carries the guard 12 for the special nut and lies outside the clamp when in locking position.

I claim:

1. The combination of a spare wheel carrier having a plate of a size to be covered by the skirt that surrounds the hub of a spare wheel, from which plate outwardly extends a stud adapted to project through an aperture in the skirt of the spare wheel when supported against the said plate of the carrier; a band member separable from the wheel carrier and adapted to encircle the tire of the wheel, having one end located between the said plate of the carrier and the skirt of the wheel hub, means independent of the wheel for securing said end of the band to the carrier, the other end of the band being provided with an aperture for receiving said stud; a wheel securing means mounted on said stud, and means for preventing unauthorized removal of said wheel securing means.

2. The combination of a spare wheel carrier having a plate of a size to be covered by the skirt that surrounds the hub of a spare wheel, from which plate outwardly extends a stud adapted to project through an aperture in the skirt of the spare wheel when supported against the said plate of the carrier; a band member adapted to encircle the tire of the wheel, means independent of the wheel for rigidly securing one end of the band member to the carrier plate, in position intermediate the said skirt and the carrier plate, whereby such end of the band is protected against access so long as the wheel is supported upon the carrier, the other end of said band being provided with an aperture for receiving said stud; a wheel securing means carried by said stud; and means for preventing unauthorized access to and removal of said wheel securing means.

3. The combination of a spare wheel carrier having a stud adapted to project through an aperture in the skirt of a spare wheel, a band member adapted to encircle the tire of the wheel having one end perforated and engaging the said stud at the inside of the said skirt, a nut engaging with the stud for clamping such end of the band to said carrier, located between the wheel carrier and the skirt of the wheel when the latter is supported upon the carrier, the other end of the band being free and perforated to pass over the said stud after being made to encircle the tire, means for engaging with the stud for securing the wheel upon the wheel carrier, and means for preventing unauthorized removal of the securing means.

4. The combination with a carrier having a supporting plate, and a stud projecting outward therefrom, of a tire lock consisting of a metal band adapted to encircle a tire and the rim on which it is supported, the inner end of the band being perforated so it may pass over the said stud, a nut for engaging the stud and clamping the inner end of the locking band to the carrier, a holding nut engaging with the stud and adapted to secure in place an article through which the stud passes, said article covering and protecting the nut that secures in place the inner end of the locking band, and means carried by the outer, free end of the locking band for holding the band in locking position, and preventing unauthorized access to and the removal of the said holding nut.

In testimony whereof I affix my signature.

FREDERICK W. HENKE, Jr.